Figure 1:
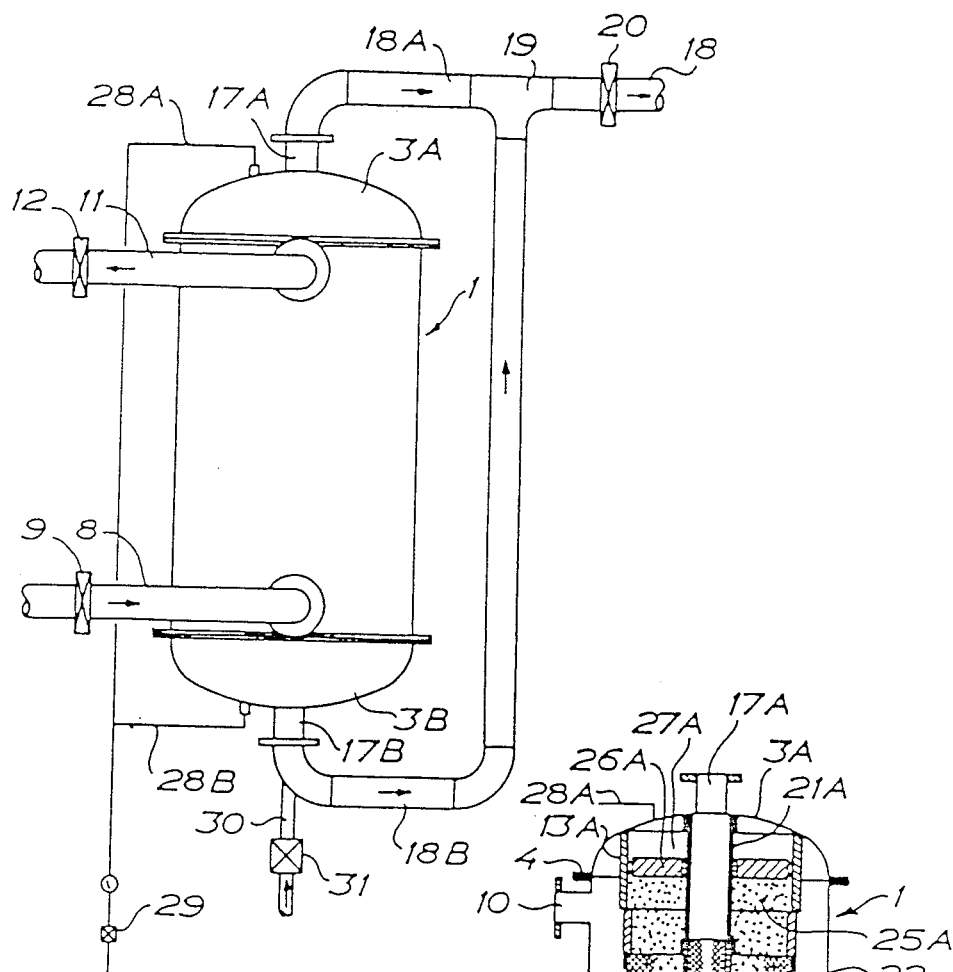

United States Patent [19]

Alm

[11] Patent Number: 4,839,040

[45] Date of Patent: Jun. 13, 1989

[54] FILTER APPARATUS FOR REMOVING HYDROCARBON CONTAMINANTS FROM WATER, PARTICULARLY FOR PURIFYING OIL CONTAMINATED WATER

[75] Inventor: Lars E. Alm, Vollsjö, Sweden

[73] Assignee: Environmental Pollution Control System EPCON AB, Horby, Sweden

[21] Appl. No.: 214,920

[22] Filed: Jun. 27, 1988

Related U.S. Application Data

[63] Continuation of Ser. No. 2,675, Feb. 2, 1987, abandoned.

[30] Foreign Application Priority Data

Apr. 9, 1985 [SE] Sweden .............................. 8501721

[51] Int. Cl.$^4$ ...................... B01D 29/26; B01D 29/38
[52] U.S. Cl. ..................... 210/167; 210/269; 210/287; 210/350; 210/443
[58] Field of Search .............. 210/167, 168, 196, 264, 210/266, 269, 283, 287, 351, 350, 352, 441, 442, 443, 315, 316, 317, 502.1

[56] References Cited

U.S. PATENT DOCUMENTS

| | | | |
|---|---|---|---|
| 927,606 | 7/1909 | Sellenscheidt | 210/351 |
| 2,190,305 | 2/1940 | Auberschek | 210/131 |
| 2,364,240 | 12/1944 | Parry | 210/131 |
| 2,543,165 | 2/1951 | Harlan | 210/131 |
| 2,593,228 | 4/1952 | Wagner | 210/134 |
| 3,838,977 | 10/1974 | Warren | 210/351 |
| 4,292,174 | 9/1981 | Smith et al. | 210/167 |

FOREIGN PATENT DOCUMENTS

| | | |
|---|---|---|
| 0057995 | 8/1982 | European Pat. Off. |
| 1326746 | 5/1962 | France . |
| 176729 | 10/1961 | Sweden . |
| 312317 | 7/1969 | Sweden . |

*Primary Examiner*—Richard V. Fisher
*Assistant Examiner*—Wanda L. Millard
*Attorney, Agent, or Firm*—Merchant, Gould, Smith, Edell, Welter & Schmidt

[57] ABSTRACT

Filter apparatus for purifying oil contaminated water, comprising a pressure resistant container (1) having a cylindrical outer shell (2) and pressure resistant end walls (3A, 3B). Disposed within the container (1) are first (5) and second (15) cylindrical inner shells, arranged concentrically and extending between the end walls (3A, 3B) and defining an intermediate, annular filter chamber (23) enclosing a particulate, elastic, oil absorbing, regeneratable filter material (24). The end portions (13A, 21A; 13B, 21B) of said first and second inner shells are fluid impervious whereas the intermediate portions thereof (14, 22) are designed as screen tubes. An axially movable, annular transverse wall (26A, 26B) is disposed in each fluid impervious portion (27A, 27B) of said filter chamber (23), said transverse walls being movable towards each other for compressing the filter material under the influence of a pressure medium supplied to the annular chambers (27A, 27B). The second inner shell (15) forms an axial tubular channel (16) which is connected to discharge outlets (17A, 17B) for purified water and also to a line for supplying a regeneration liquid. The outer shell (2) includes a connection for supplying contaminated water and a connection for discharging regeneration liquid.

6 Claims, 1 Drawing Sheet

FILTER APPARATUS FOR REMOVING HYDROCARBON CONTAMINANTS FROM WATER, PARTICULARLY FOR PURIFYING OIL CONTAMINATED WATER

This is a continuation, of application Ser. No. 002,675, filed Feb. 2, 1987, now abandoned.

The present invention relates to a filter apparatus for removing hydrocarbon contaminents from water, particularly for purifying oil contaminated water.

Purification of oil contaminated, industrial waste water is usually effected by making the waste water pass through separation units or separation basins, in which the oil rises to the surface and is removed by a skimming operation. According to the most advanced purifying method used so far the waste water is purified by flotation, in which the contaminated waste water is mixed with a quantity of water having air dispersed therein, said quantity amounting to 10-20% of the total flow. From capacity point of view, this method renders possible the purification of 8 $m^3$ on a surface of 1 $m^2$/h at a depth of water of 2 m. Recalculated into a linear velocity the known method means a velocity of 0.22 cm/second. This method is thus time consuming and the purifying capacity obtained is unsatisfactory small. Besides this method only renders possible the separation of hydrocarbons dispersed in the waste water, whereas hydrocarbons dissolved in the waste water can not be separated by flotation. In order to comply with the requirements set out with respect to the maximum acceptable hydrocarbon content in the purified water, the contaminated waste water also must be purified in a second purifying step, e.g. by using a coal screen. The processing time in the coal screen amounts to 15-20 minuets, which recalculated into linear water velocity amounts to about 0.25 cm/sec., which means a further increase in the time needed for purifying a certain quantity oil polluted waste water.

The known method mentioned above also involves disadvantages with respect to the space required, since the basins or recevoirs in which the flotation operations carried out are very space consuming. To the space required for the flotation basin should also be added the space required for coal screens of the sufficient capacity. The space thur required for known purification apparatuses of the kind mentioned thus makes it difficult to use said apparatuses and methods in such industrial plants where the space available is limited, e.g. in offshore plants, on board ships etc., which has resulted in discharge of oil contaminated waste water or discharge of waste water which only has been partially purified.

The necessity of processing the waste water in a second purifying step using a coal screen involves an additional disadvantage due to the fact that the active coal used in the coal screen can not be regenerated in situ but must be removed from the screen and transported to a regeneration plant.

One object of the present invention is to provide a filter apparatus in which the disadvantages mentioned above are eliminated or substantially decreased and which renders possible a cleaning capacity for oil contaminated water of a quite different magnitude, e.g. a purifying capacity having a linear water velocity in the magnitude of 10 cm/sec., compared with the purifying capacity obtained by using the previously known methods, and at the same time providing a filter apparatus having dimensions and space requirements which only are a fraction of what is required when using the previously known purification plants. Another object of the invention is to provide a filter apparatus which renders possible the purification none step of oil polluted waste water thereby obtaining a degree of purety sufficient to comply with the requirement set out with respect to the maximum contents of hydrocarbon accepted in the purified water, e.g. maximum 5 mg of completely extractable substances per liter, measured e.g. in accordance with Swedish standard SS No. 028145 or any similar measuring standard, at the same time eliminating the need for a second purifying step using a coal screen. Still another object of the invention is to provide a filter apparatus, the filter material of which may be regenerated in situ by directing a jet of hot water in the reverse direction through the filter, after which the filter may be used again for filtering purpose. Still another object of the invention is to provide a filter apparatus in which the filter porosity remains substantially unaffected so as to prevent the fluid from breaking through the filter material, which otherwise would result in leakage past the filter material. Still another object of the invention is to provide a filter apparatus, the filter sections of which being equally loaded.

The objects referred to above are obtained by designing the filter apparatus in accordance with the appended claims.

Figure 2:
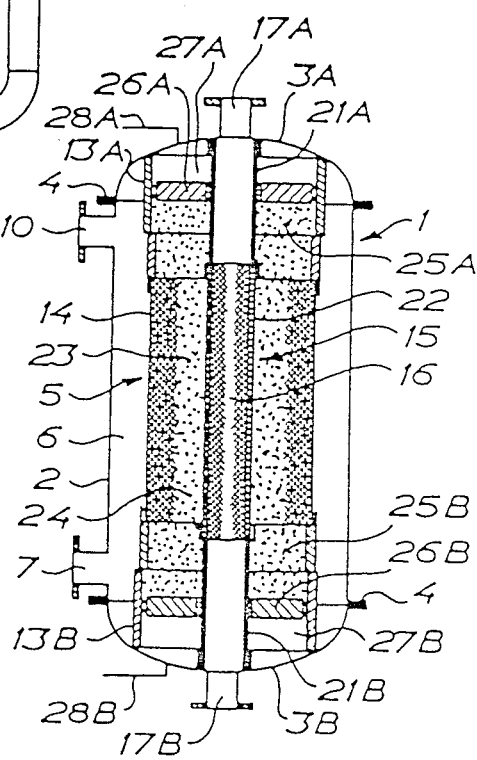

The invention will be described with reference to an embodiment illustrated on the appended drawings. On the drawings FIG. 1 is a view of a filter apparatus in accordance with the invention together with its attached pipe system, and FIG. 2 is a longitudinal section through the filter apparatus in accordance with the invention.

The filter apparatus shown in the figures consists of a container 1, designed as a pressure vessel having a cylindrical outer shell 2, which is closed at both ends by means of pressure resistant end walls 3A and 3B, preferably in the form of domed end walls, said end walls being attached to the end portions of the cylindrical shell 2, preferably by means of flange couplings 4. Disposed within the container 1 is a first inner shell 5 which is radially spaced from the outer shell 2 and extends concentrically with said outer shell from one end wall 3A to the opposite end wall 3B thereof. The first inner shell 5 defines together with the outer shell 2 an annular channel 6, which by means of a connection piece 7 at one end of the outer shell 2 may be connected to a supply line 8 for supplying contaminated water, said supply line 8 being provided with a shut-off valve 9. The opposite end of the outer shell 2 is provided with a connection piece 10 through which the annular channel 6 may be connected with a discharge line 11 for discharging oil or oil contaminated water or regeneration liquid, said discharge line 11 also being provided with a shut-off valve 12. The first inner shell 5 includes two fluidtight, cylindrical end portions 13A, 13B which are sealingly attached to the corresponding end walls 3A, 3B respectively, and an intermediate cylindrical portion 14, which forms an outer screen tube which is pervious to liquid but impervious to particulate material exceeding a certain particle size.

Disposed radially inside the first inner shell 5 is a second inner shell 15 arranged concentrically with said first inner shell and extending axially between the end walls 3A, 3B and defining an axial tubular channel 16 through the container 1. At the ends of channel 16 each of the end walls 3A, 3B is provided with a connection piece 17A, 17B, through which the tubular channel 16 is connected through each one of the branches 18A, 18B of a discharge line 18 for discharging water that has been cleaned in the filter apparatus. The branches 18A, 18B are interconnected by means of a T-piece 19 in the discharge line 18, said discharge line also being provided with a shut-off valve 20 disposed on the down stream side of the T-piece 19.

Like the first inner shell 5 the second inner shell 15 includes two fluidtight cylindrical end portions 21A, 21B, which are sealingly attached to the end walls 3A, 3B, and an intermediate cylindrical portion 22 which forms an inner screen tube which is pervious to liquid but impervious to particulate material exceeding a certain grain size.

The first inner shell 5 forms together with the second inner shell 15 an annular filter chamber 23, which is filled up with a particulate, elastic, oil absorbing regeneratable filter material, e.g. a granular polymer material. The screen tubes 14 and 22 of the first and the second inner shells 5 and 15 respectively are dimensioned so as to allow penetration of liquid but retain the particulate filter material between the screen shells 14, 22.

In each one of the annular chambers 25A and 25B, formed by the cylindrical end portions 13A, 21A and 13B, 21B respectively of the first and the second inner shells, is mounted an annular piston 26A, 26B, which by means of gaskets is in sealing relationship with the inside of the end portions 13A, 13B respectively and with the outside of the end portions 21A, 21B respectively. The pistons 26A, 26B are movable in the axial direction in the annular chambers 25A, 25B. Together with the end walls 3A, 3B the pistons 26A, 26B form pressure chambers 27A, 27B which through lines 28A, 28B and a valve 29 may be pressurized, e.g. by means of a liquid such as water of a predetermined pressure. Under the influence of the pressure in the chambers 27A, 27B the pistons 26A, 26B are forced in a direction towards each other, thereby compressing the particulate filter material incased within the filter chamber 23. By this measure the risk that an inflow of contaminated water should be able to cause lamination of the filter material or breaking up at through passage is avoided. The compression also provides a continuous compensation for the wear to which the filter material is exerted, so that the filter particles continuously are pressed towards each other.

The regeneration of the filter is carried out by return washing of hot water, and to that effect a hot water line 30 opens into the branch 18B, preferably close to the connection piece 17B in the end wall 3B. The supply of hot water is controlled by means of a shut-off valve 31 in the hot water line 30, and by opening valve 31 hot water may be supplied into the annular channel 16 formed by the inner shell 15, through the connection piece 17B as well as through the branches 18B, 18A and the connection piece 17A.

As appears from the figures the filter apparatus according to the invention is mounted in upright position, i.e. so that the cylindrical portion of the container 1 extends substantially vertically. This involves a specific advantage in case the oil contaminated water includes large quantities of free oil. When oil contaminated water with a high content of free oil is supplied into the annular space 6, the free oil will be collected in the upper portion thereof, and it will then be possible to discharge the free oil directly to an external recovery tank via the connection piece 10, line 11 and the open valve 12.

When oil contaminated waste water shall be purified by using the filter apparatus according to the invention, the procedure is as follows. After checking that valve 29 is open so that the intended pressure is maintained in the chambers 27A and 27B in order to provide required compression of the filter material in the filter chamber 23, valve 9 in the supply line 8 and valve 20 in the discharge line 18 are opened and contaminated water is then pumped into the annular space 6 between the outer shell 2 and the first inner shell 14. If large quantities of free oil is detected in the annular space 6, also valve 12 is opened so that the free oil is directly discharged to the recovery tank as described above. Valve 12 is the then closed. The waste water is then forced to pass radially inwardly through the first screen tube and through the particulate filter material and radially into the axial channel 16, and then through the discharge connection pieces 17A, 17B, branches 18A, 18B and into the discharge line 18. The oil contaminants are then absorbed one the surface of the particulate material. A great advantage with the filter apparatus according to the invention is that the filtering surface is largest at the perifery of the filter and decreases radially inwardly in a direction towards the inner screen shell. The filter apparatus according to the invention thus provides the greatest filtering surface on the side of the filter to which the waste water is supplied and where the content of contaminants is greatest. As the waste water passes in the radial direction through the filter chamber 23, the content of oil contaminants also decreases, the available filtering surface also decreasing in said direction. The supply of waste water to be purified is continued until the filter apparatus approaches saturated condition, which is reflected in that the content of hydrocarbons in the purified water approaches the maximum level that may be accepted. When this condition has been reached the valves 9 and 20 are closed, after which the filter device is regenerated.

When regeneration of the filter shall be carried out valve 12 in the discharge line 11 and valve 31 in the hot water line 30 are set open. Hot water having a temperature of 150°-160° C., i.e. overheated water, is then supplied via connection piece 17B, branches 18B and 18A and the connection piece 17A into the tubular, axial channel 16 inside the inner screen tube 22. The hot water is supplied at a pressure of about 10 bar and penetrates radially in a direction outwards through the filter material and through the outer screen tube 14. Return washing with hot water provides an extremely efficient cleaning of the filter material, the oil which has been removed from the filter particles being carried by the hot water and discharged to the external container. After completed regeneration cycle the valve 31 in the hot water line and valve 12 in the discharge line are closed, after which the filter apparatus again is ready to be used for purifying contaminated water in the manner described previously. For rendering possible a continous purifying of waste water it is preferred to use two filter apparatuses according to the invention which are arranged in parallel, one of the filter apparatuses being connected for purifying at the same time as the other filter apparatus is being regenerated.

The invention which above has been described with reference to the embodiment illustrated on the drawings is not limited to this particular embodiment but may be subject to variations within the scope of the appended claims. It may thus be possible to replace the pistons 26A, 26B by elastic membranes which are pressed in a direction towards each other under the influence of the pressure in the chambers 27A, 27B. In the illustrated embodiment one discharge connecting piece 17A, 17B is disposed at each end of the axial, tubular channel 16, which contributes to a uniform distribution of the flow of liquid through the filter chamber. the invention may however be carried out also by using only one discharge connection piece 17B disposed at one end of said channel 16.

I claim:

1. Filter apparatus for removing hydrocarbon contaminants from water, comprising:
   (a) a container (1) designed as a pressure vessel having a pressure resistant cylindrical outer shell (2), the ends of which being closed by means of pressure resistant end walls (3A, 3B);
   (b) a first cylindrical inner shell (5) disposed concentrically inside the outer shell (2) and extending from one end wall (3A) to the other (3B) and defining together with said outer shell (2) an annular space (6);
   (c) a second inner shell (15) disposed radially inside said first inner shell, said first cylindrical inner shell together with the second inner shell defining therebetween a filter chamber, said filter chamber enclosing therein a filter material;
   (d) said outer cylindrical shell (2) having disposed therein a supply connection (7) for supplying contaminated water to said annular space (6) and a discharge connection (10) for discharging contaminated water from said annular space (6);
   (e) said second inner shell (15) also extending from one end wall (3A) to the other (3B) and defining a tubular, central axial channel (16) through the container (1), said axial channel (16) by means of at least one connection (17A, 17B) being connected to a line (18) for discharging purified water, and via a connection (30) to a line for supplying regeneration liquid into said axial channel (16);
   (f) the filter material (24) enclosed in said filter chamber (23) consisting of a particulate, elastic, oil-absorbing, regeneratable filter material;
   (g) said first cylindrical inner shell (5) and said second cylindrical inner shell (15) each comprising two fluid-tight cylindrical end portions (13A, 13B; 21A, 21B), which are sealingly attached to the respective end wall (3A, 3B), and an intermediate cylindrical portion (14; 22), which is permeable to fluid but impermeable to particulate filter material; and that
   (h) disposed in each one of the annular chambers (27A; 27B) defined by said fluidtight end portions (13A, 13B; 21A, 21B) and axially movable therein is a transverse fluidtight wall (26A, 26B), said transverse walls limiting the filter chamber (23) in the axial direction and being movable towards each other in the axial direction for compressing the particulate filter material in the filter chamber (23).

2. Filter apparatus as claimed in claim 1, wherein the container (1) and the cylindrical shells therein are disposed substantially vertically, said supply connection (7) for supplying contaminated water being positioned in the lower portion of the cylindrical outer shell (2), and said discharge connection (10) for discharging contaminated water being positioned in the upper portion of said outer shell (2).

3. Filter apparatus as claimed in the claim 1, wherein each end of said tubular, central axial channel (16) is connected to a line (18A, 18B) for discharging purified water.

4. Filter apparatus as claimed in claim 1, wherein each of the chambers (27A, 27B) defined between the transverse walls (26A, 26B) and the adjacent end walls (3A, 3B) is connected to a line for supplying a pressure connected to a line for supplying a pressure medium to said chambers (27A, 27B) for exerting a pressure on said movable walls (26A, 26B) in a direction towards each other.

5. Filter apparatus as claimed in claim 1, wherein each of said movable walls consists of an annular piston (26A, 26B) which is movable in the axial direction.

6. Filter apparatus for removing hydrocarbon contaminants from water, comprising:
   (a) a container designed as a pressure vessel having a pressure resistant cylindrical outer shell, the ends of which being closed by means of pressure resistant end walls;
   (b) a first cylindrical inner shell disposed concentrically inside the outer shell and extending from one end wall to the other end wall and defining together with said outer shell an annular space;
   (c) a second inner shell disposed radially inside said first inner shell, said first cylindrical inner shell together with the second inner shell defining therebetween a filter chamber for a particulate, elastic, oil-absorbing regeneratable filter material, said second inner shell also extending from one end wall to the other end wall and defining a tubular, central axial channel through the container, said axial channel by means of at least one first connection being connected to a line for discharging purified water, and via a second connection to a line for supplying regeneration liquid into said axial channel;
   (d) said outer cylindrical shell having disposed therein a supply connection for supplying contaminated water to said annular space and a discharge connection for discharging contaminated water from said annular space; and
   (e) said first cylindrical inner shell and said second cylindrical inner shell each comprising two fluid-tight cylindrical end portions which are sealingly attached to the respective end wall, and an intermediate cylindrical portion, which is permeable to fluid but impermeable to particulate filter material, said end portions of said first cylindrical inner shell together with corresponding end portions of said second cylindrical inner shell defining first and second annular chambers, each annular chamber having disposed therein an axially movable transverse fluidtight wall, said transverse walls limiting the filter chamber in the axial direction and being movable towards each other in the axial direction for compressing the particulate filter material in the filter chamber.

* * * * *

UNITED STATES PATENT AND TRADEMARK OFFICE
CERTIFICATE OF CORRECTION

PATENT NO. : 4,839,040

DATED : June 13, 1989

INVENTOR(S) : Lars E. Alm

It is certified that error appears in the above-identified patent and that said Letters Patent is hereby corrected as shown below:

In column 1, line 36 for "minuets" read --minutes--.

In column 1, line 42 for "operations" read --operation is--.

In column 1, line 46 for "thur" read --thus--.

In column 2, line 4 for "none" read --in one--.

In column 3, line 44 for "at" read --a--.

In column 6, lines 28-29 for "toegther" read --together--.

Signed and Sealed this

Ninth Day of February, 1993

Attest:

STEPHEN G. KUNIN

*Attesting Officer*   Acting Commissioner of Patents and Trademarks